(12) United States Patent
Schioppetto et al.

(10) Patent No.: US 11,819,159 B2
(45) Date of Patent: Nov. 21, 2023

(54) ELECTRIC GRILL WITH A FILTRATION SYSTEM FOR FILTERING THE FUMES RELEASED FROM FOOD COOKING

(71) Applicants: Pedro Schioppetto, Caba (AR); Veronica Gisela Rivas, Caba (AR)

(72) Inventors: Pedro Schioppetto, Caba (AR); Veronica Gisela Rivas, Caba (AR)

( * ) Notice: Subject to any disclaimer, the term of this patent is extended or adjusted under 35 U.S.C. 154(b) by 172 days.

(21) Appl. No.: 17/503,454

(22) Filed: Oct. 18, 2021

(65) Prior Publication Data
US 2022/0202237 A1 Jun. 30, 2022

(30) Foreign Application Priority Data
Dec. 28, 2020 (AR) .......................... M20200103672

(51) Int. Cl.
| | | |
|---|---|---|
| *A47J 36/38* | (2006.01) | |
| *F24C 15/20* | (2006.01) | |
| *A47J 37/07* | (2006.01) | |

(52) U.S. Cl.
CPC ........... *A47J 36/38* (2013.01); *A47J 37/0709* (2013.01); *F24C 15/2035* (2013.01)

(58) Field of Classification Search
CPC .. F24C 15/20; F24C 15/2007; F24C 15/2014; F24C 15/2028; F24C 15/2035; F24C 15/2042; F24C 15/2064; F24C 15/2078; F24C 15/2085; F24C 15/2092; A47J 37/07; A47J 37/0704; A47J 37/0709; A47J 37/0754; A47J 37/0763; A47J 37/0786; A47J 36/38
See application file for complete search history.

(56) References Cited

U.S. PATENT DOCUMENTS

| | | | | |
|---|---|---|---|---|
| 8,490,614 B1 | * | 7/2013 | Gregory | A47J 37/0754 |
| | | | | 126/41 R |
| 9,615,693 B1 | * | 4/2017 | Merritt | A47J 37/0704 |
| 2015/0033957 A1 | * | 2/2015 | Fung | A47J 36/38 |
| | | | | 55/357 |

FOREIGN PATENT DOCUMENTS

| | | | | |
|---|---|---|---|---|
| CN | 207804084 U | * | 9/2018 | ............ A47J 37/06 |
| ES | 1215411 U | | 7/2018 | |
| ES | 1217780 U | | 9/2018 | |
| ES | 1217827 U | | 9/2018 | |
| WO | 2011/103621 A1 | | 2/2011 | |
| WO | 2014/140649 A1 | | 9/2014 | |
| WO | 2018/178467 A1 | | 10/2018 | |

* cited by examiner

*Primary Examiner* — Hung D Nguyen
(74) *Attorney, Agent, or Firm* — Howard M. Gitten, Esq.; Lewis Brisbois Bisgaard & Smith LLP

(57) ABSTRACT

An electric grill with a filtration system for filtering the fumes released from food cooked using an electric resistance acting as a heat source. The heat source is disposed below the grilling grate which extend in a horizontal plane. The grilling grate including an electric air extractor fan which removes the fumes released during cooking. The filtration system extends on the grilling grate and below the electric air extractor fan. The filtration system includes at least one metal mesh with an activated carbon filter contained in a slidable holding drawer. The drawer comprises a lower frame and an upper frame cover having pairs of quadrangular openings covered by respective metal meshes. An activated carbon sheet extends between them. The electric air extractor fan directs the purified air outside through a plurality of holes (38) defined in an upper chimney (21).

4 Claims, 3 Drawing Sheets

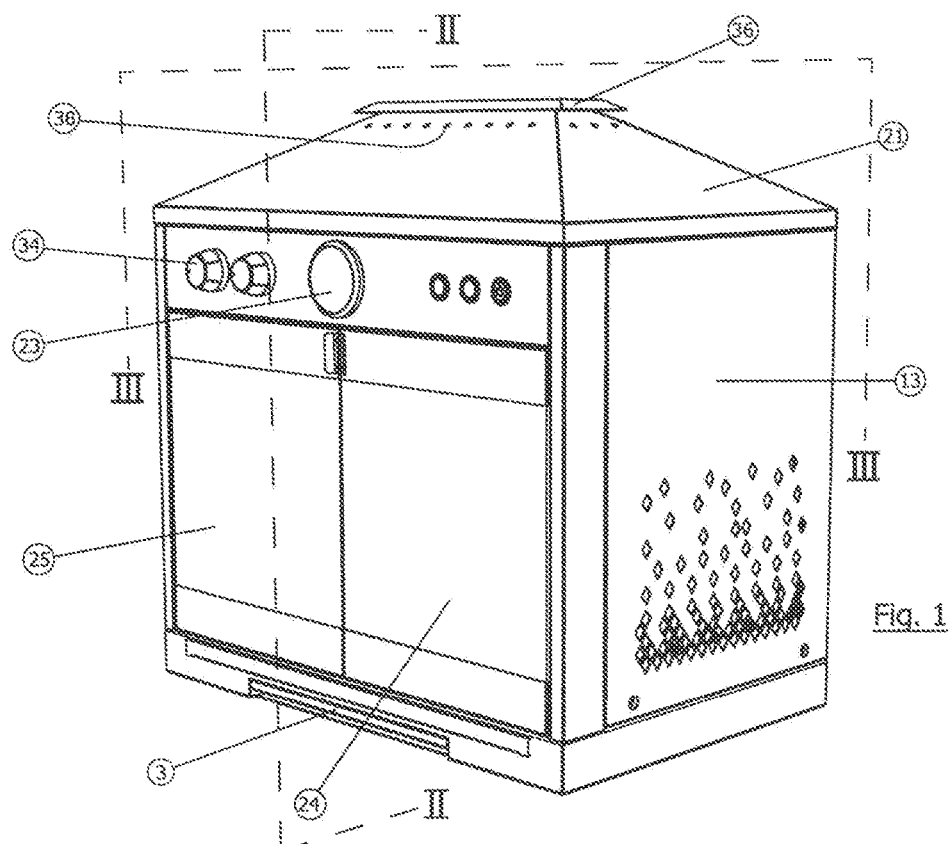
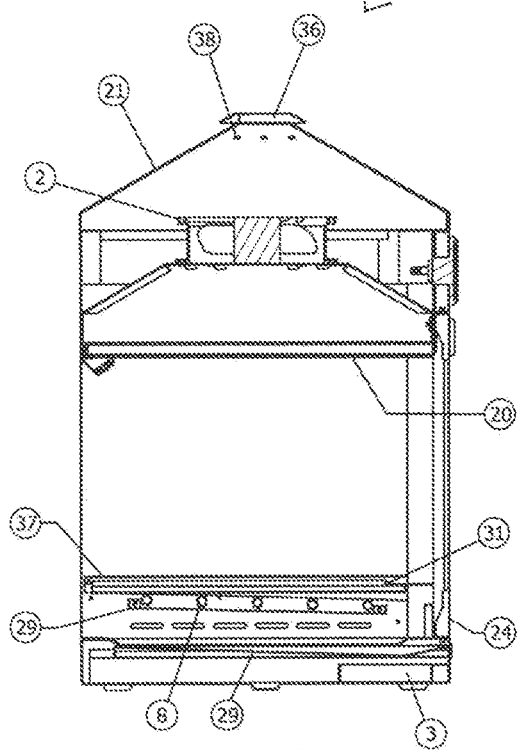
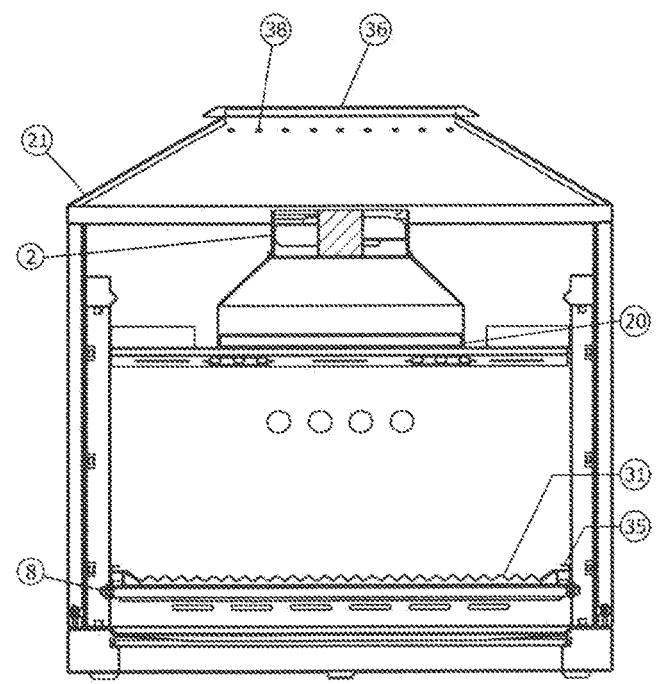
Fig. 1
Fig. 2
Fig. 3

ELECTRIC GRILL WITH A FILTRATION SYSTEM FOR FILTERING THE FUMES RELEASED FROM FOOD COOKING

CROSS REFERENCE TO RELATED APPLICATIONS

This application claims priority to and the benefit of Argentine Patent Application Ser. No. 20200103672 filed Dec. 28, 2020, the entirety of which is incorporated herein.

SCOPE OF THE INVENTION

The present invention, for which an application for Utility Model registration has been filed, is mainly related to AN ELECTRIC GRILL WITH A FILTRATION SYSTEM FOR FILTERING THE FUMES RELEASED FROM FOOD COOKING, particularly characterized by including a novel combination of structure that minimizes the presence of particles and odors released into the environment during food cooking.

More specifically, the present invention covers an electric grill of the type comprising an electrical resistance arranged below the food grilling grate and which acts as a heat source.

This invention resides in the fact that a new filtering arrangement is incorporated into the grilling grate, said filtering arrangement being specially conceived to act on the fumes given off during the cooking process, by purifying fumes by a treatment that includes a combination of filtering elements on which a suction turbine is centrally arranged in association to a chimney with air outlet holes, through which it is ensured that the outgoing smoke volume is very clean, does not pollute the environment and produces a minimum odor.

To achieve the desired result, the said filtration system is mainly characterized by the arrangement and assembly of the set of elements involved in said filtering operation. The filtration system comprises using a specific grease filter made up of metal meshes intended to retain the largest grease particles, preventing them from reaching the second filtration system, which includes an activated carbon sheet that only allows the passage of the smoke being free of the tiny particles generated from cooking.

Said combined filtration system is mounted on a special holding drawer with a cover, which is arranged in a slidable condition for cleaning or eventual replacement, with the particularity that it is located below a fan or suction turbine mounted on a casing that contains the same and rests on a support bracket.

It should be noted that this entire set of elements defining the filtration system is closed at the top by a chimney with a closed upper base so that a crowning of exhaust holes is arranged for the exit of the clean smoke free of impurities, thereby producing minimal odor.

To ensure the effective operation of the filtration system, the inventive grill is defined by a closed cabinet, made up of respective side and rear walls, and which front area comprises a pair of hinged doors that are preferably transparent to allow visual observation of the food while cooking.

The main novel feature of the electric grill of this invention lies in the incorporation, location and arrangement of the said filtration system as a whole, disposed within a closed cabinet.

PRIOR ART

At present, different types of grills are known, also called barbecues, most of which comprise a base comprising the electrical resistance that defines the heat source on which the food grilling grate is located, together with a top cover that keeps the housing area closed during cooking.

According to the prior art search carried out as to patent and utility model documents, no embodiments have been found that teach the combination of novel constructive conditions that characterize the electric grill of this invention.

In this sense, Uruguayan Utility Model U201730393 entitled BARBECUE WITH CHARCOAL BURNER AND AUTOMATIC GRILL is cited as a prior art reference, owned by Felipe Jesús Concepción Alonso, and which discloses a barbecue with automatic grill characterized by having a compartmentalized bench top covered with a set of decanting grates, front hinged doors, a rear panel, and lateral covers also equipped with hinged doors, and further comprising a series of lower ventilation grates, wherein said compartmentalized bench comprises a coal burner equipped with hinged lateral doors and an internal decanter, on which a potato and chestnut charcoal grill can rest, and where the compartment located under the charcoal bin comprising a coil for heating water, and the barbecue also being equipped with a storage compartment with a support grilling grate, where the transmission system is carried out by a gear motor which set of pulleys and steel cables act on a shaft geared at their ends, and which toothed wheels connect with the racks joined integrally to the cooking grates, and slide through the vertical guides that cross the decanting grates, and also characterized by having a gas collecting hood that takes the gases emitted through a chimney until they reach a diffuser, from where they finally emanate into the atmosphere. The prior art is also characterized by the fact that the lifting and lowering of the cooking grate are carried out automatically through the gear motor system, geared shaft, and rack. The prior art is further characterized by the fact that the charcoal burner feeds the embers to the grill, allowing their distribution through the hinged side gates. The prior art is further characterized by the fact that the compartment located under the charcoal burner has a coil for heating domestic hot water, and further by the fact that the storage compartment manages the processing times, thus allowing a continuous service to be provided. It is also characterized by the adaptable height of the cooking grates, which act synergistically together with the chimney and the diffuser, allowing a clean gas emission into the atmosphere. The prior art is further characterized by ventilation grids allowing the recirculation of air by natural convection.

Patent of invention PCT/GB2014/050836 entitled COOKING APPARATUS and held by Active Food Systems Limited is also cited in this document, which provides a combustion mixture inlet assembly for a cooking appliance, comprising upper and lower plates which are parallel and spaced from each other by a predetermined distance, a wall secured between the upper and lower plates defining an inner chamber, the spaced, parallel plates extending outwardly beyond the wall in all directions to define an outer chamber surrounding the inner chamber, a plurality of apertures in the wall to allow air between the upper and lower plates to enter the inner chamber, an inlet in the base of the inner chamber for supplying fuel into the inner chamber, and an outlet in the top of the inner chamber.

Also cited is the invention patent entitled IMPROVED VERTICAL GRILL, PCT/AU2011/000191, owned by BUZICK, Bonnie Lee, which refers to an electric grill for cooking food items, wherein the electric grill is comprised of a body containing at least one vertical grilling area disposed between at least two sources of radiant heat energy, and wherein the body is adapted to direct fats and breakaway solids generated during the cooking of the food away from the cooking elements down through the body of the electric grill and out into an external receptacle, wherein the body is adapted to direct fats and breakaway solids generated during cooking to an external receptacle by means of one or more slides that define a path to the external receptacle via an external opening of the body, wherein the one or more slides that define a path to the external receptacle via the external opening comprises a single angled slide which is disposed below the vertical grilling area and is pitched at an angle sufficient to direct fats and breakaway solids generated during the cooking of the food that drop down upon it to the external receptacle via the external opening, characterized by the fact that the angled slide is planar and is adapted to be inserted and removed front the body of the vertical grill and is disposed between the sides of the body; and wherein the angles slide is adapted to be inserted and removed from the body via the external opening.

Also cited is the utility model entitled ROTATING GRILL ON FIXED SUPPORT FOR BARBECUE granted in Uruguay, under Number U201800311, to Mr. MUÑOZ LOPEZ, Antonio, and which refers to a rotating steel barbecue grill comprising a frame and a mechanism that rotates the mobile part thereof through joints, thereby allowing the rotation of the grilling grate, and which further comprises a closing system between the two grates where food is introduced, whereby cooking is facilitated. The inventive grill is characterized by being adjusted to a metal structure base formed by tube-shaped profiles, in addition to "L" profiles welded to the base structure to hold a tray with high resistance to high temperatures where the embers will be introduced for subsequent cooking.

Also cited is the utility model entitled COMPACT BARBECUE WITH ROTATING DRUM registered in Uruguay under Number U201800457, to PRATS LLOP, Ricardo. This invention refers to a compact rotary drum barbecue, consisting of a small tabletop type barbecue, which is intended for the rapid roasting of food over hot coal, characterized by comprising a support structure, with several legs and a rear mast on which a sliding tube can move, the legs being secured to a tray of embers by means of screws, an upper structure plane (x-x) being thus defined. A motor is installed on the sliding tube, on which axis a drum fitted with a threaded support is fitted, the drum having the shape of a revolution cylinder with a flat, circular blind base and a lateral surface formed by a mesh or grid that ends in a plurality of retention tabs that make up the food loading mouth. The flat blind base is in contact with a support wheel mounted on the rear mast, leveling corrections of the barbecue being then possible employing the adjustment screws. The said invention is characterized by the fact that the level of the upper plane (x-x) of the structure, instead of being flush with the upper part of the charcoal tray, is flush with the upper part of a folding frame that swings on the rotation axis, acting on the handle of the lever, it being possible to freely remove the embers tray. This invention is characterized in that the motor is powered at an alternating voltage of 220 volts including a reducer achieving a speed of 2 to 5 rpm (revolutions per minute), connected to the network by cable with a plug equipped with an overhead switch. The cited invention is also characterized by the fact that the drum is removable by a screw. The invention is further characterized by the fact that the drum is adjustable in height and that the drum is swivel-mounted.

Also cited is the utility model entitled BARBECUE WITH ROTATING GRILL registered in Uruguay under Number U201831182, owned by GUILLEN GUILLEN, Alvaro Cristóbal. This invention refers to a barbecue with a rotating grill, characterized by comprising a cradle, with a "U" section, of considerable length, a cradle preferably obtained from concrete blocks, refractory bricks, or any other heat-resistant construction material, on which bottom the food cooking embers are to be settled, while in correspondence with the upper edges of the side walls of said cradle a pair of profiles are set and on which one or more double rotating grilling grates are articulated, based on two sheets equipped with hinging means as well as closing/opening means on their opposite side, and which in their middle area include a pivot axis that is articulately linked to the two said profiles, with the particularity that one of the ends of the rotation axis of each of the grilling grates ends in a pinion joined thereto, and that it is linked to a transmission system set within one of the profiles and driven by a motor. The invention is further characterized in that the transmission system associated with the inner part of the profile is embodied in a chain transmission system. The invention is also characterized by the fact that the transmission system associated with the inner part of the profile comprises a worm gear transmission system.

None of the above prior art documents effectively solves the problem related to air pollution during food cooking, caused by the fats and oils released in the process.

Indeed, a wide range of problems arise in all cases, which focus mainly on the following aspects:

a) Due to the effect of heat, foods give off fats and oils that fall directly on the burners, and their combustion generates volatile components that impregnate the food and, according to recent expert opinions, some of them are carcinogenic.

b) For the same reason, a large amount of smoke is produced simultaneously, which makes the use of the grill uncomfortable and which, on the other hand, prevents its use in public or private environments that lack an appropriate smoke outlet.

c) Burnt residues from fats and oils considerably pollute the grilling grate, so that high-level maintenance is required to keep it in hygienic and correct operating conditions.

BRIEF DESCRIPTION OF THE INVENTION—ADVANTAGES

The purpose of the electric grill with a filtration system for filtering the fumes released from food cooking referred to in this invention is to permanently and satisfactorily solve the previously commented problems, in each one of the different aspects discussed above.

In fact, the inventive grill comprises the basic construction conditions of any conventional electric grill and is characterized by the particular arrangement included to perform the said filtering action. In this sense, it is to be noted that the inventive grill makes use of an electric air extractor fan arranged to operate effectively on the entire surface of the grilling grate that contains the food.

This extractor works permanently while the food is being cooked, directing the smoke throughout the complete built-in filtration system without undesired deviations, and then towards a special outlet chimney.

The movement of the blades of the said central fan, when rotating, impulses the air coming from below and causes it to rise, that is, the air is sucked up completely and, as it occurs in a closed cabinet, the air is fully oriented so that after passing through a novel transverse drawer extended in a horizontal plane and holding the filters, it advances towards an upper chimney, characterized by the fact that the fumes go out through a crowning of holes defined below a top closure cover.

According to this invention, the air stream that carries the fumes generated from cooking passes through the set of purifying filters, so that fumes are discharged outside always with a minimum of odor and without environmental contamination.

Said inserted filtration system comprises a grease filter made up of metal meshes that are intended to retain the largest grease particles, preventing them from reaching the second filter where the activated carbon is included.

Precisely, the activated carbon filter is included in a holding drawer that also includes metal meshes, so that fumes (tiny particles of fat released from cooking) are allowed to pass and, once duly purified by the action of said carbon, are driven outside, as sucked up by the fan, cooler or turbine.

Likewise, a significant portion of the fats and oils released from the cooking process fall by gravity onto a lower waste-collecting tray.

As indicated above, to ensure the efficient operation of the filtering arrangement, the inventive grill comprises a closed cabinet that, in addition to the said upper chimney, includes side and rear walls and a pair of transparent doors located at the front.

According to the invention, the inventive electric grill may have one or more grids and/or grates, in the latter case intended for different types of food, such as one for meat and another for fish, to avoid mixing flavors.

BRIEF DESCRIPTION OF THE DRAWINGS

To specify the advantages thus briefly commented, to which many other may be added by users and experts in the art, and to better understand the constructive, constitutive, and functional characteristics of the inventive electric grill, an example of the preferred embodiment is described below, which is illustrated schematically and without a specific scale in the attached sheets of drawings. Therefore, the exemplary embodiment is not intended to limit the scope of protection of this present invention but merely to assist as an explanatory illustration of the basic concept on which the invention is based.

FIG. 1 is a perspective view showing the cabinet that houses the electric grill of this invention;

FIG. 2 is a vertical sectional view, according to the trace plane II-II indicated in FIG. 1;

FIG. 3 is a vertical sectional, according to the trace plane III-III indicated in FIG. 1;

It is made clear that, in all the Figures, the same or equivalent parts or constituent elements of the assembly correspond to the same reference numbers and letters, according to the example chosen for the present description of the inventive electric grill.

DETAILED DESCRIPTION OF THE PREFERRED EMBODIMENT

List of References

1=Regulator
2=Extractor
3=Grease tray
4=Rear wall
5=On-off switch
6=Indicator switch
7=Indicator switch
8=Resistance
9=Side supporting beam
10=Side supporting beam
11=Rivet holder
12=Threaded rivet
13=Right side wall
14=Left side wall
15=Lower front
16=Upper front
17=Extractor casing
18=Right extractor bracket
19=Left extractor bracket
20=Filter drawer
21=Chimney
22=Base light
23=Pyrometer
24=Right door
25=Left door
26=Drip tray
27=Base
28=Grease tray
29=Grated support
30=Magnet
31=Grate
32=Right side plate
33=Left side plate
34=Knob
35=Right grate guide
36=Chimney top cover
37=Left grate guide
38=Purified air outlet ports
39=Lower frame of the filter holding drawer
40=Upper frame of the filter holding drawer
41=Filter mesh
42=Filter mesh
43=Metal filter mesh
44=Activated carbon filter As shown in FIG. 1, the electric grill of this invention consists of a closed cabinet which front side comprises a pair of transparent doors (24) and (25), and it is closed at the top by a chimney body (21).

As indicated above, the inventive grill differs from any other that is known to date because, being a closed cabinet, it incorporates a new and specific filtration system specially designed to avoid or limit to a minimum the release of odors to the outside environment.

Figure 5:
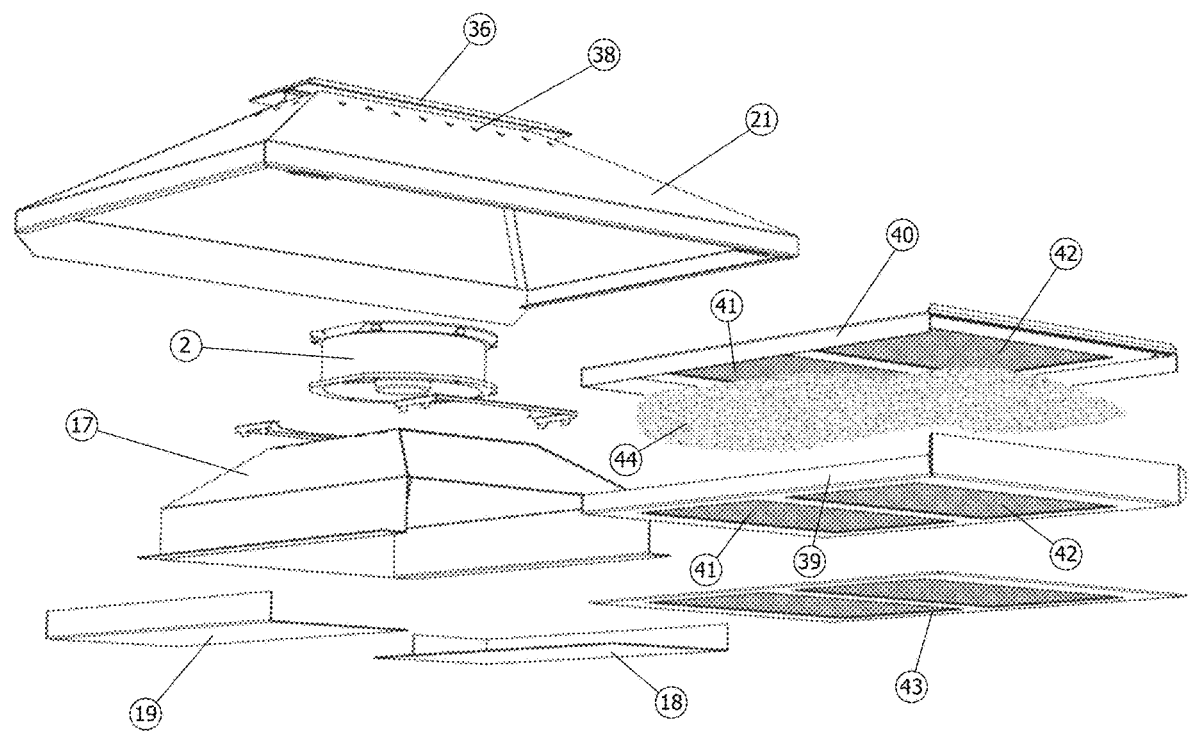
FIG. 5 is an exploded perspective detailed view showing the combination of structures that make up the filtration system incorporated into the electric grill of this invention.
Figure 6:
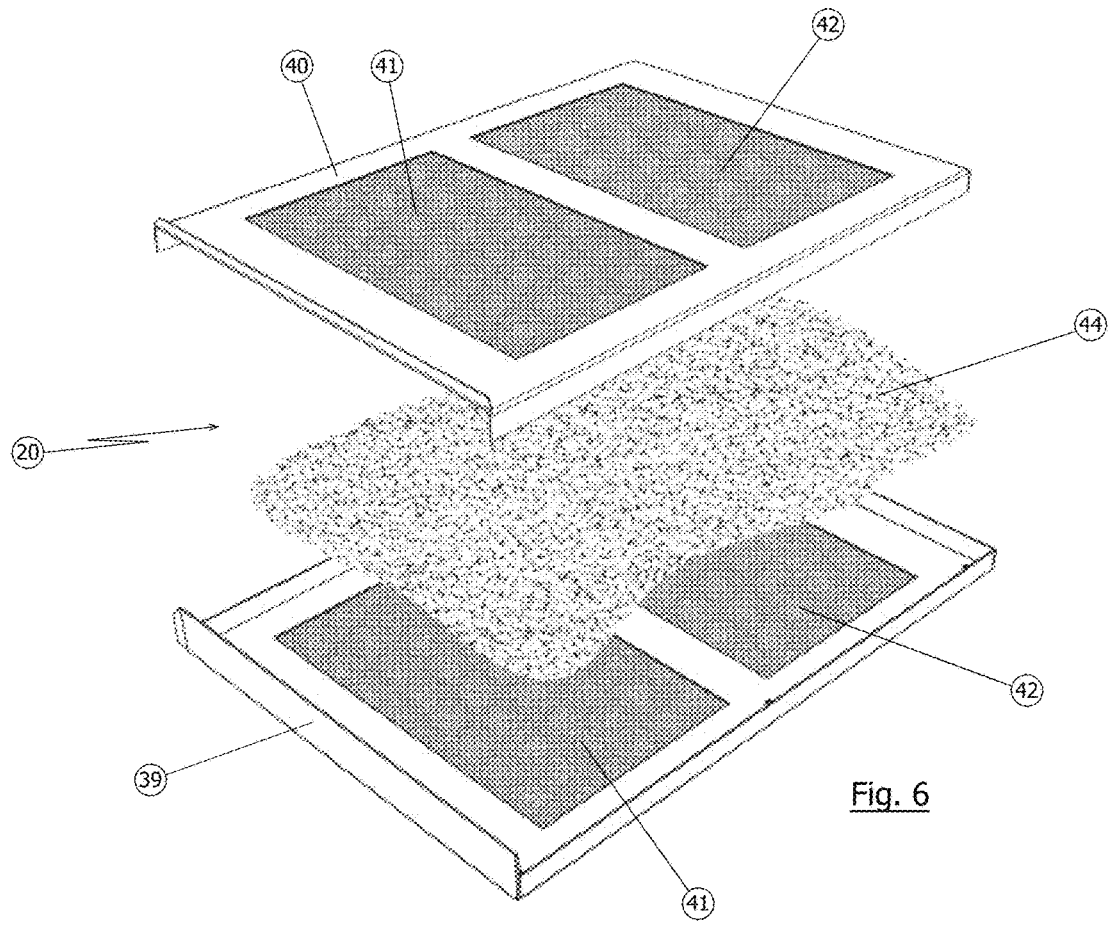
FIG. 6 is an exploded perspective view of a preferred embodiment of the filter holding drawer used in the grill of this invention.

As shown by FIGS. 2 and 3, the grilling grate (31) mounted on the guides (37) is arranged slightly separated from the electrical resistance (8) that acts as a source of heat for cooking the food; while the drawer (20) holding a novel combination of filters shown in FIGS. 5 and 6 appears above in a horizontal plane.

The same FIGS. 2 and 3 show that this filter holding drawer (20) is inserted into the lower opening of the flared casing (17) that receives the smoke extractor fan (2), ensuring that the smoke released from cooking passes through said drawer before being led to the outside environment.

It can be seen that the outlet of the purified air occurs through the crowning of holes (38) because the upper base of the chimney (21) is kept closed with the cover (36).

Figure 4:
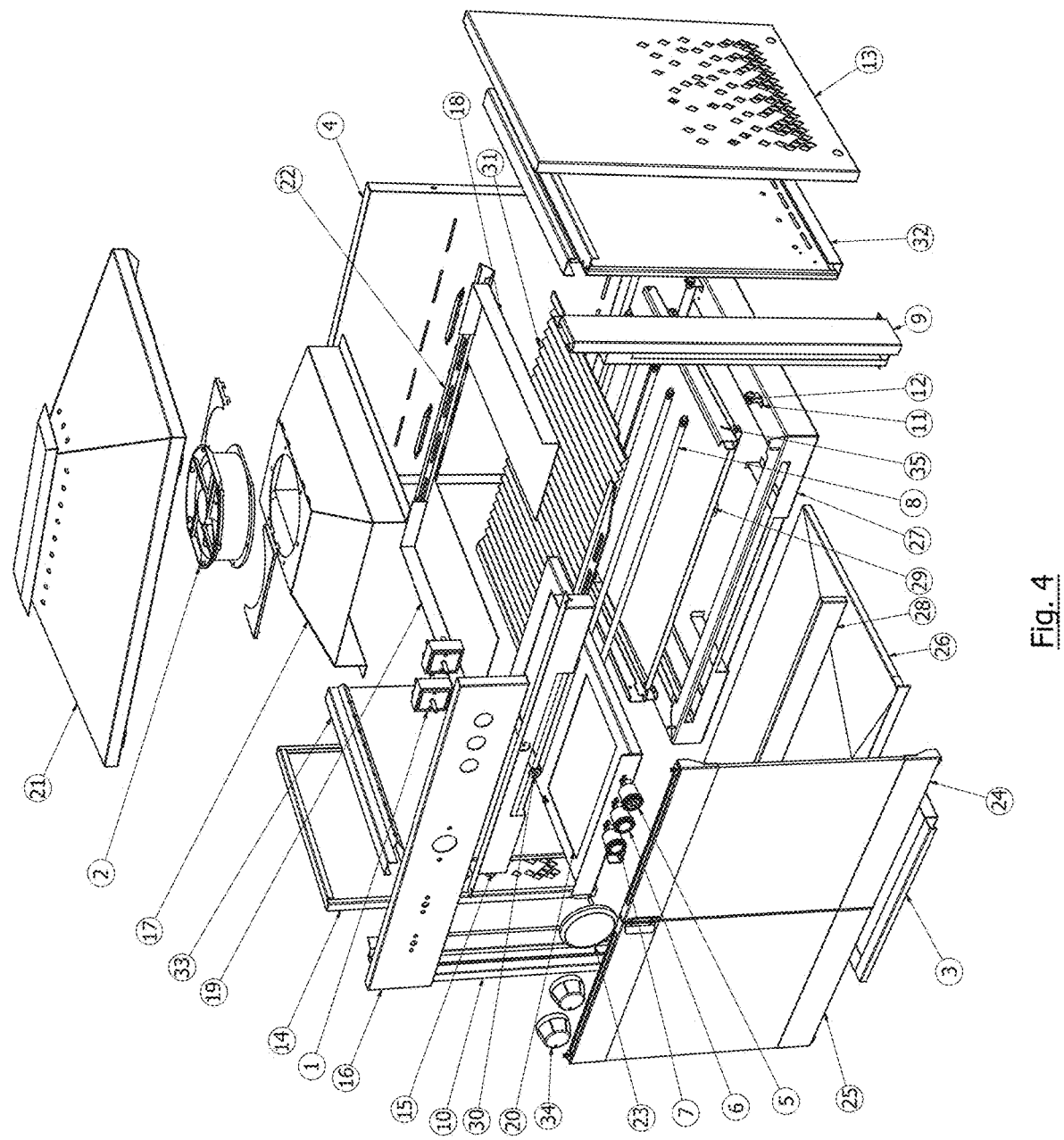
FIG. 4 is an exploded perspective view of the electric grill constructed in accordance with the invention.

Referring now to the exploded perspective view of FIG. 4, the said filter holding drawer (20) is arranged in a slidable condition with its marginal edge sections resting on the lateral flat brackets (18) and (19), on which the lateral edges of the flared casing (17) holding the said smoke extractor (2) are also supported.

Accordingly, all the fumes released during the cooking of food are completely dragged through the filter holding drawer (20), without unwanted deviations, thereby ensuring effective treatment for eliminating impurities and odors carried by them.

With reference now to FIGS. 5 and 6, a preferred embodiment is shown for the assembly and arrangement of the filters that are used to effectively purify the fumes released from cooking.

A drawer (20) is shown, which consists of a lower frame (39) and an upper frame cover (40) characterized by having pairs of quadrangular openings that are covered by respective metal meshes (41) and (42).

Specifically, FIG. 5 shows the optional embodiment comprising a first metal filter mesh (43) designed to retain the largest grease particles, on which the said drawer (20) extends and includes the activated carbon filter (44).

FIG. 6 has been included to represent a preferred embodiment of said filter holding drawer (20), and where an activated carbon filter (41) extends between both upper (40) and lower (39) frames.

Having described and exemplified the nature and main object of the present invention, as well as how it can be put into practice, the following is claimed:

1. An electric grill with a filtration system, comprising: a grilling grate for receiving food thereon, an electric resistance, which acts as a heat source, disposed below the grilling grate, the grilling grate extending in a horizontal plane, said grilling grate including an electric air extractor fan, the air extractor fan removing fumes released from food during cooking, and the filtration system is disposed above the grilling grate and below the electric air extractor fan, said filtration system having a slidable holding drawer and at least one metal mesh formed with an activated carbon filter; the metal mesh being disposed in the slidable holding drawer; and a flared casing and lateral flat brackets, and wherein the slidable holding drawer is supported, at marginal edge sections thereof by the lateral flat brackets and the lateral edges of a flared casing that holds the electric air extractor fan are supported by the lateral flat brackets.

2. The electric grill with a filtration system, according to claim 1, wherein the slidable holding drawer comprises a lower frame and an upper frame each of said lower frame and upper frame having a respective pair of quadrangular openings, each of said quadrangular openings being covered by respective metal meshes, and an activated carbon sheet is disposed between said lower frame and said upper frame.

3. The electric grill with a filtration system, according to claim 1, wherein the filtration system comprises a first metal mesh and a second metal mesh coplanar with the first metal mesh, the drawer holding the activated carbon filter being disposed on each of the first metal mesh and second metal mesh.

4. The electric grill with a filtration system, according to claim 1, further comprising an upper chimney, a plurality of holes formed in the upper chimney wherein the electric air extractor fan directs the purified air outside through the crowning of holes.

\* \* \* \* \*